United States Patent
Lee

(10) Patent No.: US 11,224,862 B2
(45) Date of Patent: Jan. 18, 2022

(54) REFERENCE MATERIAL FOR PERFORMANCE EVALUATION OF A CATALYST FOR SELECTIVE CATALYTIC REDUCTION, A PREPARATION METHOD THEREOF, AND A PERFORMANCE EVALUATION METHOD FOR A CATALYST USING THE SAME

(71) Applicants: HYUNDAI MOTOR COMPANY, Seoul (KR); KIA MOTORS CORPORATION, Seoul (KR)

(72) Inventor: Sang Nam Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/940,108

(22) Filed: Jul. 27, 2020

(65) Prior Publication Data

US 2021/0354115 A1    Nov. 18, 2021

(30) Foreign Application Priority Data

May 18, 2020    (KR) .................. 10-2020-0059399

(51) Int. Cl.

| | | |
|---|---|---|
| *B01D 53/94* | (2006.01) | |
| *B01J 21/12* | (2006.01) | |
| *B01J 23/72* | (2006.01) | |
| *B01J 35/02* | (2006.01) | |
| *B01J 37/02* | (2006.01) | |
| *B01J 37/04* | (2006.01) | |
| *B01J 37/08* | (2006.01) | |
| *F01N 3/20* | (2006.01) | |
| *F01N 3/28* | (2006.01) | |

(52) U.S. Cl.
CPC .......... *B01J 23/72* (2013.01); *B01D 53/9418* (2013.01); *B01J 21/12* (2013.01); *B01J 35/026* (2013.01); *B01J 37/0215* (2013.01); *B01J 37/0236* (2013.01); *B01J 37/04* (2013.01); *B01J 37/08* (2013.01); *F01N 3/2066* (2013.01); *F01N 3/2825* (2013.01); *B01D 2255/20715* (2013.01); *B01D 2255/20761* (2013.01); *F01N 2330/06* (2013.01); *F01N 2370/02* (2013.01); *F01N 2510/00* (2013.01)

(58) Field of Classification Search
CPC ... B01J 23/72; B01J 21/12; B01J 35/02; B01J 37/04; B01J 37/02; B01J 37/08; B01D 53/94; B01D 53/9418; B01D 53/9422; B01D 2255/20761; F01N 3/2066; F01N 3/28; G01N 23/00; G01N 23/02; G01N 23/083
See application file for complete search history.

(56) References Cited

U.S. PATENT DOCUMENTS

| | | | |
|---|---|---|---|
| 4,031,387 A * | 6/1977 | Lattin | ................... G01N 23/00 250/252.1 |
| 9,468,915 B2 | 10/2016 | Vaarkamp | |
| 10,512,901 B2 | 12/2019 | Tang | |
| 2014/0271422 A1 | 9/2014 | Tang | |
| 2014/0274665 A1 | 9/2014 | Vaarkamp | |
| 2016/0101412 A1* | 4/2016 | Bull | ..................... B01J 29/068 502/60 |

FOREIGN PATENT DOCUMENTS

KR    20150128697 A    11/2015

* cited by examiner

*Primary Examiner* — Timothy C Vanoy
(74) *Attorney, Agent, or Firm* — Lempia Summerfield Katz LLC

(57) ABSTRACT

A reference material for performance evaluation of a catalyst of a selective catalytic reduction includes a ceramic carrier and a coating material that coats the ceramic carrier. The coating material includes copper (Cu), alumina ($Al_2O_3$), and silica ($SiO_2$). A method of preparing the reference material includes mixing copper (Cu) and an acidic solution to prepare a copper-containing solution, mixing the copper-containing solution, alumina, and silica to prepare a mixture, and coating the mixture on the ceramic carrier, and drying and baking the mixture coated on the ceramic carrier.

8 Claims, No Drawings

REFERENCE MATERIAL FOR PERFORMANCE EVALUATION OF A CATALYST FOR SELECTIVE CATALYTIC REDUCTION, A PREPARATION METHOD THEREOF, AND A PERFORMANCE EVALUATION METHOD FOR A CATALYST USING THE SAME

CROSS-REFERENCE TO RELATED APPLICATION

This application claims the benefit of priority to Korean Patent Application No. 10-2020-0059399, filed in the Korean Intellectual Property Office on May 18, 2020, the entire contents of which are incorporated herein by reference.

TECHNICAL FIELD

The present disclosure relates to a reference material capable of safely evaluating performance of a catalyst for a selective catalytic reduction in a short time, a method for manufacturing the same, and a performance evaluation method for the catalyst using the same.

BACKGROUND

A selective catalytic reduction (SCR) device is a device that removes nitrogen oxides (NOx), which are a cause of acid rain and generate photochemical smog, and purifies a diesel oxide catalyst (DOC) and NOx that is not purified in a diesel particle filter (DPF) catalyst through a reduction reaction. In one example, the SCR device reduces NOx to nitrogen gas using a catalyst to remove NOx, an atmospheric harmful substance. Ammonia ($NH_3$) and urea are most widely used as a reducing agent of the SCR device, and the catalyst consists of a carrier and a catalytic activator coated on the carrier.

For example, Korean Patent Publication No. 2015-0128697 discloses an SCR catalyst system including a first SCR catalyst composition and a second SCR catalyst composition. The first SCR catalyst composition promotes higher $N_2$ formation and lower N2O formation compared to the second SCR catalyst composition, the second SCR catalyst composition has a different composition from the first SCR catalyst composition, and the first catalyst composition is located laterally upstream of the second catalyst composition.

Meanwhile, various methods for measuring activity of the SCR catalyst are used because the purification activity of the SCR device depends on the activity of the catalyst. The method for measuring the activity of the SCR catalyst is usually using an inductively coupled plasma-atomic emission spectroscopy (ICP-AES). In detail, the method of measuring a content of a catalytic activator, such as copper, with ICP-AES after the catalyst is coarsely pulverized and finely pulverized, is pretreated with strong acid is widely used. The above-described conventional measuring method of catalyst activity has low safety due to using the strong acid and long pretreatment time of 4 hours to 2 days or more.

Therefore, there is a need for research and development of a method for evaluating the performance of the catalyst for the selective catalytic reduction which improves safety because the strong acid is not used when the catalyst activity is evaluated and is improved in analytical efficiency due to short pretreatment time of the sample.

SUMMARY

The present disclosure has been made to solve the above-mentioned problems occurring in the prior art while advantages achieved by the prior art are maintained intact.

An embodiment of the present disclosure provides a method for evaluating performance of a catalyst for a selective catalytic reduction which is improved in safety because a strong acid is not used when catalyst activity is evaluated and is improved in analytical efficiency due to short pretreatment time of a sample, a reference material used in the performance evaluation method, and a method of preparing the same.

The technical problems to be solved by the present inventive concept are not limited to the aforementioned problems, and any other technical problems not mentioned herein will be clearly understood from the following description by those having ordinary skill in the art to which the present disclosure pertains.

According to an embodiment of the present disclosure, a reference material for performance evaluation of a catalyst for a selective catalytic reduction includes a ceramic carrier and a coating material that coats the ceramic carrier, and the coating material includes copper (Cu), alumina ($Al_2O_3$), and silica ($SiO_2$).

According to an embodiment of the present disclosure, a method of preparing a reference material for performance evaluation of a catalyst for a selective catalytic reduction (SCR) includes mixing copper (Cu) and an acidic solution to prepare a copper-containing solution, mixing the copper-containing solution, alumina, and silica to prepare a mixture, and coating the mixture on a ceramic carrier, drying and baking the mixture coated on the ceramic carrier to prepare the reference material.

According to an embodiment of the present disclosure, a method of evaluating performance of a catalyst for a SCR includes pulverizing the reference material, mixing the pulverized reference material and a first binder and pressurized-molding the pulverized reference material and the first binder to prepare a reference sample, analyzing the reference sample with an X-ray fluorescence analyzer (XRF) to establish an evaluation reference, drying and pulverizing the SCR catalyst, mixing the pulverized catalyst and a second binder and pressurized-molding the pulverized catalyst and the second binder to prepare a sample, and analyzing the sample with the XRF and comparing the sample with the evaluation reference to evaluate the performance of the catalyst.

DETAILED DESCRIPTION

Throughout the specification, when a part "includes" an element, another element may be further included, rather than excluding the existence of another element, unless otherwise described.

Throughout the specification, when a member is referred to as being "on" another member, the member is in contact with another member or yet another member is interposed between the two members.

Throughout the Specification, when values or percentages, or ranges or ratios of values and percentages, are given, the values, ranges, and ratios may be understood in some cases to encompass values or percentages at or within 10% of the values, ranges, or ratios. For example, a range of 100 to 300 μm may encompass a range of 90 to 300 μm. Other deviations from values and ranges may be specified greater than or less than 10%.

Reference Material for Performance Evaluation of SCR Catalyst

A reference material according to the present disclosure includes a ceramic carrier and a coating material covering the ceramic carrier. In one example, the coating material includes copper (Cu), alumina ($Al_2O_3$), and silica ($SiO_2$).

Ceramic Carrier

The ceramic carrier includes the coating material formed thereon to increase a surface area and is a medium providing an adhesive surface.

In one example, the ceramic carrier is made of ceramic and is not particularly limited as long as it is usually available as a carrier, for example, zeolite, cordierite, cordierite-α-alumina, silicon nitride, zircon mullite, spodumene, alumina-silica-magnesia, zircon silicate, sillimanite, magnesium silicate, zircon, petalite, α-alumina, aluminosilicate, and the like.

Coating Material

The coating material, which is a catalytic activator, serves to promote a reduction reaction of NOx. In some cases, the coating material may cover the surface of the ceramic carrier, for example, may have a form of a wash coat. The wash coat means a thin coating layer applied to the surface of the ceramic carrier, which has a function of purifying a harmful exhaust gas.

In addition, the coating material includes copper (Cu), alumina ($Al_2O_3$), and silica ($SiO_2$). Specifically, the coating material includes alumina ($Al_2O_3$), copper supported on alumina, and silica ($SiO_2$).

In one example, an average thickness of the coating material may be 100 to 300 μm, or 120 to 250 μm.

In addition, the coating material may further include zirconium (Zr).

The reference material may include copper of 0.6 to 0.9% by weight, 0.65 to 0.85% by weight, or 0.67 to 0.83% by weight based on the total weight. When a content of copper in the reference material is within the above range, an effect of promoting the reduction reaction, which is an effect due to copper even with the content of copper, may be appropriate, and thus economic efficiency may be improved.

Specifically, the copper content in the reference material may be a design specification value (Nominal) ±8%. That is, the reference material may be formed as a minimum specification reference material containing copper in the minimum amount of the design specification value and a maximum specification reference material containing copper in the maximum amount of the design specification value. For example, when the copper (Cu) content of the design specification value is 0.7645% by weight, the copper content in the minimum specification reference material may be 0.7033% by weight and the copper content in the maximum specification reference material may be 0.8257% by weight.

Method for Preparing Reference Material for Performance Evaluation of SCR Catalyst In addition, a method of preparing a reference material for evaluating performance of a catalyst for a selective catalytic reduction (SCR) according to the present disclosure includes: preparing a copper-containing solution; mixing the copper-containing solution, alumina ($Al_2O_3$), and silica ($SiO_2$) to prepare a mixture; and coating the mixture on a ceramic carrier, and drying and baking the mixture to prepare a reference material.

Preparing Copper-Containing Solution

In this operation, copper (Cu) and an acidic solution are mixed to prepare the copper-containing solution.

The copper may have an average particle size of 20 to 40 μm, or 25 to 30 μm. When the average particle size of copper is within the above range, mixing is facilitated in the preparation of the mixture, adhesion is improved when the mixture is coated on the carrier, and an area in contact with an exhaust gas is increased, thereby improving an effect on exhaust gas purification.

The acidic solution is not particularly limited as long as it may dissolve copper, and may include, for example, at least one of hydrochloric acid and nitric acid. Specifically, the acidic solution may include hydrochloric acid and nitric acid. More specifically, the acidic solution may include hydrochloric acid and nitric acid in a volume ratio of 2 to 4:1, or 2.5 to 3.5:1. When the volume ratio of hydrochloric acid and nitric acid in the acidic solution is within the above range, there is an effect that copper dissolves easily.

The copper-containing solution may be a mixture of copper and acidic solution in a mass ratio of 1:10 to 30, or a mass ratio of 1:15 to 26. When the mixed mass ratio of the copper and the acidic solution is within the above range, there is an effect that the dissolution of copper is easily performed.

Preparing Mixture

In this operation, the copper-containing solution, alumina, and silica are mixed to prepare the mixture.

Alumina may have an average particle size of 20 to 40 μm, or 25 to 30 μm. When the average particle size of alumina is within the above range, an adhesion force is improved when the mixture is coated on the carrier and a reaction area with the exhaust gas is increased to improve an effect of exhaust purification.

In addition, silica may have an average particle size of 20 to 40 μm, or 25 to 30 μm. When the average particle size of silica is within the above range, an adhesion force is improved when the mixture is coated on the carrier, and the reaction area with the exhaust gas is increased to improve an effect of exhaust purification.

This operation may include: mixing the copper-containing solution and alumina to allow the copper to be supported on alumina, to prepare a support material; and mixing the support material and silica.

First, the copper-containing solution and alumina are mixed to support the copper on alumina to prepare the support material. In one example, copper in the copper-containing solution and alumina may be mixed in a weight ratio of 1:10 to 25, or 1:14 to 22 when the copper-containing solution and alumina is mixed. When the mixed weight ratio of copper and alumina is within the above range, the exhaust gas purification effect may be improved.

Next, the support material and silica may be mixed to prepare a mixture. For example, the mixture may include the support material, silica and water. In addition, the mixture may further include zirconium (Zr).

In one example, the support material and silica may be mixed in a weight ratio of 1:2.0 to 3.0, or a weight ratio of 1:2.1 to 2.4.

The mixture may have a viscosity of 300 to 350 cP, or 300 to 320 cP, at 25° C. and may have an average particle size of 5 to 20 μm, 7 to 15 μm, or 8 to 12 μm. When the viscosity of the mixture at 25° C. is within the above range, the reaction area is increased to improve the exhaust gas purifying ability, and when the average particle size is within the above range, coating the mixture on the ceramic carrier is facilitated.

In addition, grinding may be further included to adjust the average particle size within the above range. In one example, the grinding may be performed for 1 to 4 hours, or 2 to 3 hours, but is not limited thereto.

Preparing Reference Material

In this operation, the mixture is coated on the ceramic carrier, is dried, and is baked to prepare the reference material.

The coating is not particularly limited as long as it may be used to form a wash coat.

The drying may be performed at 90 to 120° C. or 100 to 110° C. for 1 to 3 hours, or 2 to 2.5 hours. Through the drying, moisture may be removed.

Through the baking, the ceramic carrier and the coating material are firmly bonded and a metal such as zirconium in the coating material may be made of oxide to control reactivity in the air. In one example, the baking may be performed at 500 to 700° C. or 550 to 600° C. for 1 to 3 hours or 1.5 to 2 hours.

Method for Evaluating Performance of SCR Catalyst

In addition, a method for evaluating performance of a catalyst for a selective catalytic reduction (SCR) according to the present disclosure includes pulverizing the reference material as described above, mixing the pulverized reference material and a first binder and pressurized-molding the mixed reference material and the first binder to prepare a reference sample, analyzing the reference sample with an X-ray fluorescence analyzer (XRF) to establish an evaluation reference, drying and pulverizing a SCR catalyst, mixing the pulverized catalyst and a second binder and pressurized-molding the mixed catalyst and the second binder to prepare a sample, and analyzing the sample with an XRF and comparing the sample with the evaluation reference to evaluate performance of the catalyst.

Pulverizing Reference Material

In this operation, the reference material as described above is pulverized.

The pulverizing allows a particle size of an analysis sample to be decreased to reduce an analysis error. In one example, the pulverizing may adjust a target average particle size in consideration of wavelength distribution of X-rays and intensity of fluorescent X-rays, used in the analysis. For example, the pulverized reference material may have an average particle size of 15 to 35 μm.

In addition, the pulverizing may include coarsely pulverizing the analysis sample to have an average particle size of 50 to 100 μm, and finely pulverizing the analysis sample to have an average particle size of 15 to 35 μm. Specifically, the pulverizing may include coarsely pulverizing the analysis sample to have an average particle size of 50 to 80 μm, and finely pulverizing the analysis sample to have an average particle size of 20 to 30 μm.

In addition, the method of performance evaluation of the present disclosure may further include drying the reference material before the pulverizing.

Drying Reference Material

Through this operation, it is possible to remove moisture and/or foreign matter which is absorbed by the reference material. In one example, the drying may be performed at 500 to 700° C. or at 550 to 600° C. for 0.5 to 2 hours or 1 to 1.5 hours.

Preparing Reference Sample

In this operation, the pulverized reference material and the first binder are mixed and pressurized-molding the mixed reference material and the first binder to prepare the reference sample.

In one example, the pulverized reference material and the first binder may be mixed in a 1:0.1 to 0.5 weight ratio or 1:0.2 to 0.4 weight ratio. When the mixed weight ratio of the pulverized reference material and the first binder is within the above range, there is an effect that bonding characteristics between the reference material and the first binder is improved and molding characteristics is improved.

The first binder serves to facilitate the molding of the reference material when analyzed by an XRF. The first binder may include at least one selected from the group consisting of polyvinyl alcohol, polystyrene, and cellulose. Specifically, the first binder may include polyvinyl alcohol.

In addition, the first binder may have a weight average molecular weight of 20,000 to 35,000 g/mol, or 29,000 to 32,000 g/mol. When the weight average molecular weight of the first binder is within the above range, binding strength with the reference material is improved and a surface of the prepared reference sample is homogeneous to prevent diffuse reflection of fluorescent X-rays, thereby improving reliability of performance evaluation.

The pressurized-molding is not particularly limited as long as it is a method that may be commonly used for analysis with an XRF. For example, a reference sample in a form of pellets may be prepared using a molding cap and a compression press.

Establishing Evaluation Reference

In this operation, the reference sample is analyzed with an XRF to establish evaluation reference.

In analysis conditions of the XRF, an analysis element is copper, analysis angle is 45 to 46 Kα, about 45.010 Kα, 40 to 41 Kβ, or about 40.435 Kβ, and analysis time is 250 to 350 seconds or 280 to 320 seconds.

In addition, when analyzing the XRF, a detector may use a scintillation detector, a spectrometer may use LIF1, voltage of the X-ray tube may be 40 to 65 kV, 40 to 50 kV, or 60 to 65 kV, and current may be 40 to 60 mA, 40 to 50 mA, or 55 to 60 mA.

The evaluation reference may be the content of copper in the reference material.

Drying and Pulverizing SCR Catalyst

In this operation, the SCR catalyst is dried and pulverized.

Through the drying, it is possible to remove moisture and/or foreign matter absorbed by the SCR catalyst. In one example, the drying may be performed at 500 to 700° C. or at 550 to 600° C. for 0.5 to 2 hours or 1 to 1.5 hours.

The pulverizing allows a particle size of the catalyst to be decreased to reduce an analysis error. In one example, the pulverizing may adjust a target average particle size in consideration of wavelength distribution of X-rays and intensity of fluorescent X-rays, used in the analysis.

In addition, the pulverizing may be performed to allow the average particle size to be 15 to 35 μm. In particular, the pulverizing may include coarsely pulverizing the catalyst to have an average particle size of 50 to 100 μm, and finely pulverizing the catalyst to have an average particle size of 15 to 35 μm. Specifically, the pulverizing may include coarsely pulverizing the catalyst to have an average particle size of 50 to 80 μm, and finely pulverizing the catalyst to have an average particle size of 20 to 30 μm.

Preparing Sample

In this operation, the pulverized catalyst and the second binder are mixed, and pressurized-molding the mixed catalyst and second binder to prepare the sample.

In one example, the pulverized catalyst and the second binder may be mixed in a 1:0.1 to 0.5 weight ratio or 1:0.2 to 0.4 weight ratio. When the mixing weight ratio of the pulverized catalyst and the second binder is within the above range, there is an effect that bonding characteristics between the pulverized catalyst and the second binder is improved and molding characteristics are improved.

The second binder serves to facilitate the molding of the reference material when analyzed by XRF. The second binder may include at least one selected from the group consisting of polyvinyl alcohol, polystyrene, and cellulose. Specifically, the second binder may include polyvinyl alcohol.

In addition, the second binder may have a weight average molecular weight of 20,000 to 35,000 g/mol or 29,000 to 32,000 g/mol. When the weight average molecular weight of the second binder is within the above range, binding strength with the reference material is improved and the surface of the prepared reference sample is homogeneous to prevent diffuse reflection of fluorescent X-rays, thereby improving the reliability of performance evaluation.

The pressurized-molding is not particularly limited as long as it is a method that may be commonly used for analysis with an XRF. For example, a reference sample in a form of pellets may be prepared using a molding cap and a compression press.

Evaluating Performance of Catalyst

In this operation, the sample is analyzed by an XRF and the performance of the catalyst is evaluated by comparing with the evaluation reference. In one example, the performance of the catalyst may be evaluated through a copper content in the catalyst.

In detail, the copper content of the sample may be quantitatively analyzed by the XRF based on the copper content of the reference material, which is an evaluation reference and the copper content in the catalyst may be measured to perform the performance evaluation of the catalyst. In one example, the evaluation reference may be a copper content ±8% of the design specification value (Nominal).

In the evaluating of the performance of the catalyst, the catalyst performance may be evaluated as insufficient catalyst performance when the copper content of the sample is less than 99 or more than 102, or less than 99.5 or more than 101, based on the copper content of 100 in the reference material which is the evaluation reference.

In analysis conditions of the XRF, an analysis element is copper, analysis angle is 45 to 46 Kα, about 45.010 Kα, 40 to 41 Kβ, or about 40.435 Kβ, and analysis time is 250 to 350 seconds or 280 to 320 seconds.

In addition, when analyzing the XRF, a detector may use a scintillation detector, a spectrometer may use LIF1, voltage of the X-ray tube may be 40 to 65 kV, 40 to 50 kV, or 60 to 65 kV, and current may be 40 to 60 mA, 40 to 50 mA, or 55 to 60 mA.

The method for evaluating the performance of the catalyst according to the present disclosure has improved safety because the strong acid is not used and has improved analytical efficiency due to the short pretreatment time of the sample.

Hereinafter, the present disclosure will be described in more detail through Examples. However, Examples are only for understanding the present disclosure, and the scope of the present disclosure is not limited to Examples in any sense.

Example 1. Preparation of Reference Material

TABLE 1

| Weight of reference material | Carrier(L) | Cu(g) | $Al_2O_3$ (g) | $SiO_2$ (g) |
|---|---|---|---|---|
| 429.69(g) | 1.00 | 2.9146 | 58.8154 | 138.2700 |

2.9146 g of copper in powder form having an average particle size of 27±2 μm and 70 g (60 mL) of dissolved acid mixed with hydrochloric acid and nitric acid in a volume ratio of 3:1 as an acidic solution were placed in a glass container and were stirred at room temperature for 2 hours to prepare a copper-containing solution.

Thereafter, 230 g of water and 58.2585 g of alumina ($Al_2O_3$) in powder form having an average particle size of 27±2 μm were mixed, and added the copper-containing solution a little at a time while being stirred at 50 rpm for 3 hours to prepare a support material.

Thereafter, the support material and 138.2700 g of silica ($SiO_2$) in a powder form having an average particle size of 27±2 μm were mixed to prepare a coating material having a viscosity of 310 cP at 25° C.

Then, the coating material was pulverized to have an average particle size of 10 μm, the pulverized coating material was placed in a flat container, 1 L of ceramic zeolite, as a carrier, was approached, and the carrier was vacuum-coated. Thereafter, the coated ceramic carrier was placed in a dry oven at about 100° C. and treated for 2 hours to be dried. Subsequently, reference material-1 was prepared by baking at 550° C. for 2 hours using an electric furnace.

The prepared reference material-1 had a total weight of 429.69 g and a copper content of 0.6783% by weight based on the total weight.

Examples 2 and 3

Reference material-2 and reference material-3 were prepared in the same manner as Example 1, except that copper contents were adjusted to have the copper contents shown in Table 2.

TABLE 2

| | Copper content in reference material (% by weight) | Amount of copper in powder form as raw material (g) |
|---|---|---|
| Example 1 | 0.6783 | 2.9146 |
| Example 2 | 0.7645 | 3.4715 |
| Example 3 | 0.8298 | 3.9194 |

Test Example 1. Verification of Reference Material (ICP-AES)

The reference material was dried at 550° C. for 2 hours, coarsely pulverized to an average particle size of 70±20 μm, and finely pulverized to an average particle size of 20±5 μm to measure the copper content of the reference material of Examples. 0.27 g of the reference material was added to 18 g of mixed acid containing hydrochloric acid, nitric acid, and hydrofluoric acid in a volume ratio of 3:2:3. The reference material and the mixed acid were completely decomposed with microwave for 2 hours and were analyzed for 20 seconds using an inductively coupled plasma spectroscopy (ICA-AES) ULTIMA-2. In one example, as ICA-AES analysis conditions, an analytical wavelength of a copper element was selected as 324.754 nm, a photoelectric amplification detector was used as a detector, and a calibration curve was prepared by a standard addition method. The measured copper contents are shown in Table 3 below.

TABLE 3

| (% by weight) | Copper content | | |
|---|---|---|---|
| | Reference value | ICA-AES measured value | Error value ((reference value − measured value)/reference value) |
| Example 1 | 0.6783 | 0.6765 | −0.27% |
| Example 2 | 0.7645 | 0.7673 | +0.37% |
| Example 3 | 0.8298 | 0.8287 | −0.13% |

As shown in Table 3, as a result of ICP-AES, the reference materials of Examples 1 to 3 were suitable as a reference material with a target copper content of ±0.5% by weight or less.

Test Example 2. XRF Analysis of Reference Material (Establishment of Evaluation Reference)

16 g of the reference material pulverized in Test Example 1 and 5 g of polyvinyl alcohol (weight average molecular weight: 29,000 g/mol) were mixed, were put into a molding cap (diameter: 38 mm, height: 9 mm, aluminum material, cylindrical shape), and were pressurized at 20 tons for 1 minute using a compression press to prepare reference samples each having a cylinder form. Subsequently, the copper contents were measured using an XRF under conditions shown in Table 4 below for the reference samples and results were shown in Table 5.

TABLE 4

| Analysis element | Analysis angle (Kα) | Spectrometer | Collimator (Irradiation) | Detector | PHA LL | PHA UL | X-ray tube Voltage (kV) | X-ray tube Current (mA) | Analysis time (second) |
|---|---|---|---|---|---|---|---|---|---|
| Cu | 45.01 | LIF1 | 300 μm | Scintillation | 100 | 300 | 60 | 60 | 300 |

TABLE 5

| (% by weight) | Copper content | | |
|---|---|---|---|
| | Reference value | XRF measured value | Error value ((reference value − measured value)/reference value) |
| Example 1 | 0.6783 | 0.6755 | −0.41% |
| Example 2 | 0.7645 | 0.7657 | +0.16% |
| Example 3 | 0.8298 | 0.8279 | −0.23% |

As shown in Table 5, as a result of XRF, the reference materials of Examples 1 to 3 were suitable as a reference material with a target copper content of ±0.5% by weight or less.

Test Example 3. XRF Analysis (Performance Evaluation)

Catalysts prepared using copper contents of reference values in Table 6 as target contents were dried at 550° C. for 2 hours, were coarsely pulverized to have an average particle size of 70±20 μm, and were finely pulverized to have an average particle size of 20±5 μm. Subsequently, in the same manner as in Test Example 2, the catalysts and binders were mixed and pressurized-molded and were analyzed with an XRF. The results were shown in Table 6.

TABLE 6

| | Copper content (% by weight) | | |
|---|---|---|---|
| | Reference value | XRF measured value | Error value (measured value/design value*100) |
| No. 1 | 0.6755 | 0.6783 | 99% |
| No. 2 | 0.7673 | 0.7645 | 100.4% |
| No. 3 | 0.8287 | 0.8298 | 99.9% |
| No. 4 | 0.5475 | 0.5523 | 99.3% |
| No. 5 | 0.575 | 0.5703 | 101.0% |
| No. 6 | 0.4901 | 0.4954 | 98.9% |

As shown in Table 6, it was seen that the performance evaluation method of the present disclosure had improved safety because the strong acid was not used and had improved analytical efficiency due to the short pretreatment time of the sample.

The performance evaluation method for the catalyst using the reference material according to the present disclosure has improved safety because the strong acid is not used and has improved analytical efficiency due to the short pretreatment time of the sample.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A method of evaluating performance of a catalyst for a selective catalytic reduction (SCR), the method comprising:
   pulverizing a reference material;
   mixing the pulverized reference material and a first binder and pressurized-molding the pulverized reference material and the first binder to prepare a reference sample;
   analyzing the reference sample with an X-ray fluorescence analyzer (XRF) to establish an evaluation reference;
   drying and pulverizing the catalyst;
   mixing the pulverized catalyst and a second binder and pressurized-molding the pulverized catalyst and the second binder to prepare a sample; and
   analyzing the sample with the XRF and comparing the sample with the evaluation reference to evaluate the performance of the catalyst,
   wherein the reference material includes
   a ceramic carrier, and
   a coating material configured to coat the ceramic carrier, and
   wherein the coating material includes copper (Cu), alumina ($Al_2O_3$), and silica ($SiO_2$).

2. The method of claim 1, wherein the copper is supported on the alumina.

3. The method of claim 1, wherein the coating material further includes zirconium (Zr).

4. The method of claim 1, wherein the reference material includes the copper of 0.6 to 0.9% by weight based on a total weight.

5. The method of claim 1, wherein the pulverized reference material has an average particle size of 15 to 35 μm, and wherein the pulverizing of the catalyst is performed to have an average particle size is 15 to 35 μm.

6. The method of claim 1, wherein the first binder and the second binder respectively include at least one selected from a group consisting of polyvinyl alcohol, polystyrene, and cellulose, and have a weight average molecular weight of 20,000 to 35,000 g/mol, independently.

7. The method of claim 1, wherein the XRF has analysis conditions, and in the analysis conditions, an analysis element is copper, analysis angle is 45 to 46 Kα, or 40 to 41 Kβ, and analysis time is 250 to 350 seconds.

8. The method of claim 1, wherein, in the evaluating of the performance of the catalyst, the catalyst performance is evaluated as insufficient catalyst performance when a copper content of the sample is less than 99 or more than 102, based on the copper content of 100 in the reference material which is evaluation reference.

* * * * *